Patented July 13, 1926.

1,592,210

UNITED STATES PATENT OFFICE.

ERWIN HOFFA, OF HOCHST-ON-THE-MAIN, GERMANY, ASSIGNOR, BY MESNE ASSIGNMENTS, TO GRASSELLI DYESTUFF CORPORATION, OF NEW YORK, N. Y., A CORPORATION OF DELAWARE.

PROCESS FOR PREPARING HALOGENATED OXYTHIONAPHTHENES.

No Drawing. Application filed April 5, 1924, Serial No. 704,494, and in Germany April 28, 1923.

Acylated oxythionaphthenes are, for instance, obtained by boiling aryl-ortho-thioglycolcarboxylic acids of the type:

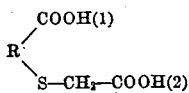

(wherein R stands for a substituted or nonsubstituted aromatic residue) with acetic anhydride in presence of anhydrous sodium acetate.

Now, we have found that by causing halogenating agents to act upon such acylated oxythionaphthenes, compounds halogenated in the aryl residue are obtained which, when saponified, are converted into halogenated oxythionaphthenes. It is not necessary to start from isolated oxythionaphthenes or to isolate the acyloxythionaphthenes. The mixture obtained from the reaction between arylthioglycolcarboxylic acid, acetic anhydride and sodium acetate may also be directly subjected to halogenation.

The above mentioned process is quite novel and surprising inasmuch as it could not be foreseen that the halogen would enter into the aryl residue and not into the nucleus containing sulphur. There was rather still to be expected an addition of the halogen to the sulphur. The process offers, moreover, the technical advantage that it permits one to obtain halogenoxythionaphthenes which, otherwise, could only be obtained from halogenarylthioglycolcarboxylic acids, the preparation of which is very troublesome. Furthermore, by oxidizing the said halogenated oxythionaphthenes there are immediately produced halogenated thioindigos which, if halogenarylthioglycolcarboxylic acids were not used as starting material, could only be made by halogenation of the finished dyestuffs which requires however the drying of the dyestuff and the use of a solvent. The easy preparation of halogenated oxythionaphthenes is of particular importance when it is desired to prepare asymmetric thioindigos or dyestuffs of the indirubin type which contain the halogen in only one component, because in case of a subsequent halogenation both components would be substituted.

The following examples illustrate our invention:

(1) 26 parts of naphthalene-2.3-thioglycolcarboxylic acid:

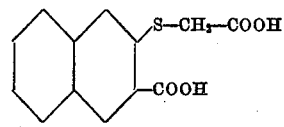

are boiled for one hour on the reflux cooler with 100 parts of acetic anhydride and 5 parts of dehydrated sodium acetate. Into the mass, after having cooled down to 20-30°, are introduced while stirring, 16 parts of bromine, dissolved in 50 parts of glacial acetic acid. The colour of the bromine disappears at once. The solvent is distilled off and the residue dissolved by boiling with 200 parts of alcohol, 40 parts of caustic soda solution of 40° Bé. and 150 parts of water. The solution contains the sodium salt of the halogenated oxythionaphthene which can be isolated therefrom by one of the known methods or the solution may be directly made up into the dyestuff by oxidizing it, for instance with potassium ferricyanide. The dyestuff thus obtained dyes cotton a blue shade of excellent properties in respect of fastness. The dyestuff probably corresponds to the following formula:

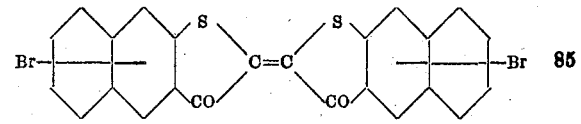

(2) 26 parts of naphthalene-2.3-thioglycolcarboxylic acid are boiled as indicated in example (1) with acetic anhydride and sodium acetate. Into the mass, after it has cooled down to 20-30° C. are slowly introduced, while stirring, 14 g. of sulfuryl chloride. The solvent is distilled off and the residue is dissolved by boiling it with 200 parts of alcohol, 40 parts of caustic soda solution of 40° Bé. and 100 parts of water. The solution then contains the sodium salt of the halogenated oxythionaphthene, which can be further worked up in the known manner.

(3) 24, 2 parts of the acetyl-compound of the 5.6-benzo-3-oxythionaphthene after it has been re-precipitated from alcohol, are dissolved in 200 parts of glacial acetic acid, cooled down to 10° and to this solution are slowly added 16 parts of bromine dissolved in 50 parts of glacial acetic acid. The colour of the bromine disappears at once while hydrobromic acid is evolved. The solvent is distilled off in vacuo, the residue is boiled for a short time with 150 parts of alcohol, 60 parts of caustic soda solution of 40° Bé. and 150 parts of water and then oxidized with potassium ferricyanide for the purpose of obtaining the brominated dyestuff.

(4) 21 parts of phenylthioglycol-o-carboxylic acid are boiled in the reflux-cooler with 80 parts of acetic anhydride and 4 parts of anhydrous sodium acetate. The mass is cooled to 0° C. and there are slowly added thereto 16 parts of bromine. After having distilled off the solvent in vacuo, the product is boiled for a short time with 120 parts of alcohol, 20 parts of caustic soda solution 40° Bé. and 100 parts of water. The solution contains the halogenated oxythionaphthene, the bromine atom being probably in the para-position to the sulfur atom, and can be oxidized by means of potassium ferricyanide for the purpose of obtaining the brominated dyestuff. The dyestuff probably corresponds to the following formula:

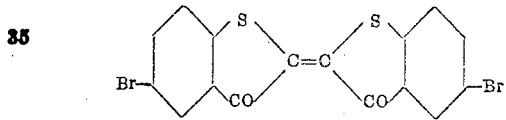

(5) 12, 8 parts of the acid of the formula:

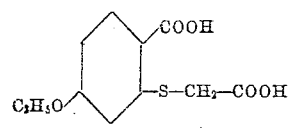

are boiled with 40 parts of acetic anhydride and 2 parts of sodium acetate for one hour. After cooling to 0° C. 8 parts of bromine are slowly added to 0° C. The mixture is allowed to stand for some hours, the solvent is distilled off in a vacuum and the residue is boiled with 60 parts of alcohol, 60 parts of water and 10 parts of caustic soda solution 40° Bé. The filtered solution is oxidized by adding potassium ferricyanide for the purpose of obtaining the brominated dyestuff. The bromine atom probably enters into the para-position to the sulfur atom.

The dyestuff probably corresponds to the following formula:

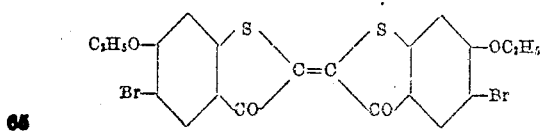

(6) 5, 7 parts of 4, 5-benzo-3-oxythionaphthene of the formula:

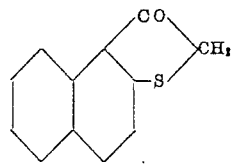

are converted with 20 parts of acetic anhydride and one part of sodium acetate into the acetyl compound. To the solution thus obtained 4, 5 parts of bromine are added at 0° C. After the mixture has been allowed to stand for several hours the solvent is distilled off in a vacuum and the residue is boiled for a short time with a mixture of 30 parts of alcohol, 30 parts of water and 5 parts of caustic soda solution 40° Bé. The solution is then filtered and oxidized with potassium ferricyanide for the purpose of obtaining the brominated dyestuff.

The new products may be represented by the following general formula:

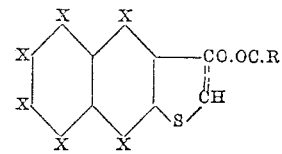

wherein at least one X represents a halogen atom, the others being hydrogen or any other substituent and R represents an alkyl residue.

Having now described my invention, what I claim is:—

1. The process for preparing halogenated intermediate products for the preparation of vat dyestuffs, which consists in causing halogenating agents to act upon oxythionaphthenes acylated in the nucleus containing sulfur.

2. The process for preparing halogenated intermediate products for the preparation of vat dyestuffs, which consists in causing halogenating agents to act upon oxythionaphthenes acylated in the nucleus containing sulfur and saponifying the compounds thus obtained.

3. As a new product, the acylated oxythionaphthene of the following formula:

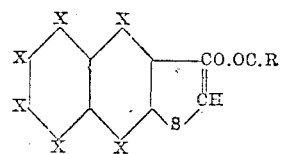

wherein at least one X represents a halogen atom, the others being hydrogen or any other substituent and R representing an alkyl residue.

In testimony whereof, I affix my signature.

ERWIN HOFFA.